United States Patent

[11] 3,573,827

| [72] | Inventors | Isaac De Botton<br>Pinebrook;<br>Arthur Simon, Fairlawn, N.J. |
|---|---|---|
| [21] | Appl. No. | 717,552 |
| [22] | Filed | Apr. 1, 1968 |
| [45] | Patented | Apr. 6, 1971 |
| [73] | Assignee | The Bendix Corporation |

[54] RUNWAY CENTERLINE DISPLAY
7 Claims, 4 Drawing Figs.

[52] U.S. Cl. .................................................. 343/108,
340/27
[51] Int. Cl. ...................................................... G01s 1/16
[50] Field of Search .......................................... 343/108,
108 (SI); 340/27; 244/77 (A); 73/178

[56] References Cited
UNITED STATES PATENTS
3,237,193  2/1966  Curry, Jr. et al. ............. 343/108(SI)
3,242,493  3/1966  Westerback .................. 343/108
3,305,865  2/1967  Gassler ......................... 343/108
3,324,471  6/1967  Rover, Jr. ...................... 343/108

Primary Examiner—Richard A. Farley
Assistant Examiner—Richard E. Berger
Attorneys—Anthony F. Cuoco and Plante, Hartz, Smith and Thompson ABSTRACT: Apparatus using a signal from a ground based station, a signal corresponding to the known heading of a runway and signals provided by onboard sensors in conjunction with pilot inputs to present to the pilot of an aircraft in a head-up display a visual representation of a runway centerline for landing the aircraft under all weather conditions. A voltage is provided in response to aircraft position and attitude signals for adjusting the position of the displayed centerline so that said centerline is always coincident with the true runway centerline.

Patented April 6, 1971 3,573,827

INVENTORS
ISAAC DE BOTTON
ARTHUR SIMON
BY Anthony T. Crow
ATTORNEY

Patented April 6, 1971

INVENTORS
ISAAC DE BOTTON
ARTHUR SIMON
BY
ATTORNEY

RUNWAY CENTERLINE DISPLAY

CROSS REFERENCE TO RELATED PATENTS

The device of the present invention may be used in conjunction with apparatus disclosed and claims in U.S. Pat. Nos. 3,237,195 granted Feb. 22, 1966 to Julius Schiffman and 3,230,819 granted Jan. 25, 1966 to Paul A. Noxon, both of which patents are assigned to the Bendix Corporation, assignee of the invention, and U.S. Pat. No. 3,237,293 granted Feb. 22, 1966 to R.S. Curry, et al. and assigned to the Sperry Rand Corporation.

BACKGROUND OF THE INVENTION N

1. Field of the Invention

This invention relates to means for aiding a pilot to land an aircraft under all weather conditions and, more particularly, to means for providing a true world display having a visual representation of a runway centerline superimposed thereon.

2. Description of the Prior Art

Prior to the present invention All Weather Landing Systems (AWLS) were of the flight director type wherein information is displayed on indicators and the pilot follows said information to land the craft, and of the autopilot type which automatically controls the craft to touchdown. Both of the systems depend on ground based instrument landing systems (ILS) and the pilot has no opportunity to monitor landings using an independent source or to exercise his judgement during all weather landings. The present invention permits the pilot to view the real world and upon which view are superimposed illuminated status information lines corresponding to the earth's horizon and the centerline of the runway. The pilot may thus land the aircraft manually as if visibility were good or he may build up confidence in an automatic system by monitoring said system.

SUMMARY OF THE INVENTION

This invention contemplates apparatus for aiding a pilot in landing an aircraft under all weather conditions and includes a head-up display showing the real world with illuminated lines corresponding to the earth's horizon and a runway centerline superimposed thereon. The display includes a marker corresponding to a point on the true runway centerline and provided in response to a signal from a ground based station located on said runway centerline. The line corresponding to the runway centerline leads from the marker at the known heading of the true runway centerline and intersects the horizon line at a vanishing point. The pilot initially sets the display by manually rotating the displayed centerline about the vanishing point until it meets the marker and thereafter the displayed centerline is automatically rotated about the vanishing point in response to aircraft airspeed, altitude and heading error signals, and continuously moves with the flight of the craft.

One object of this invention is to provide means for aiding a pilot in landing an aircraft under all weather conditions.

Another object of this invention is to provide a head-up display showing the true world with lines corresponding to a runway centerline and the earth's horizon superimposed thereon.

Another object of this invention is to display a maker corresponding to a point on the true runway centerline in response to a signal from a ground based station located on said centerline, and to display a line extending from said marker at the known heading of the runway and intersecting the horizon line at a vanishing point, and which displayed line corresponds to the runway centerline.

Another object of this invention is to automatically rotate the displayed centerline about the vanishing point in accordance with the movement of the aircraft.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
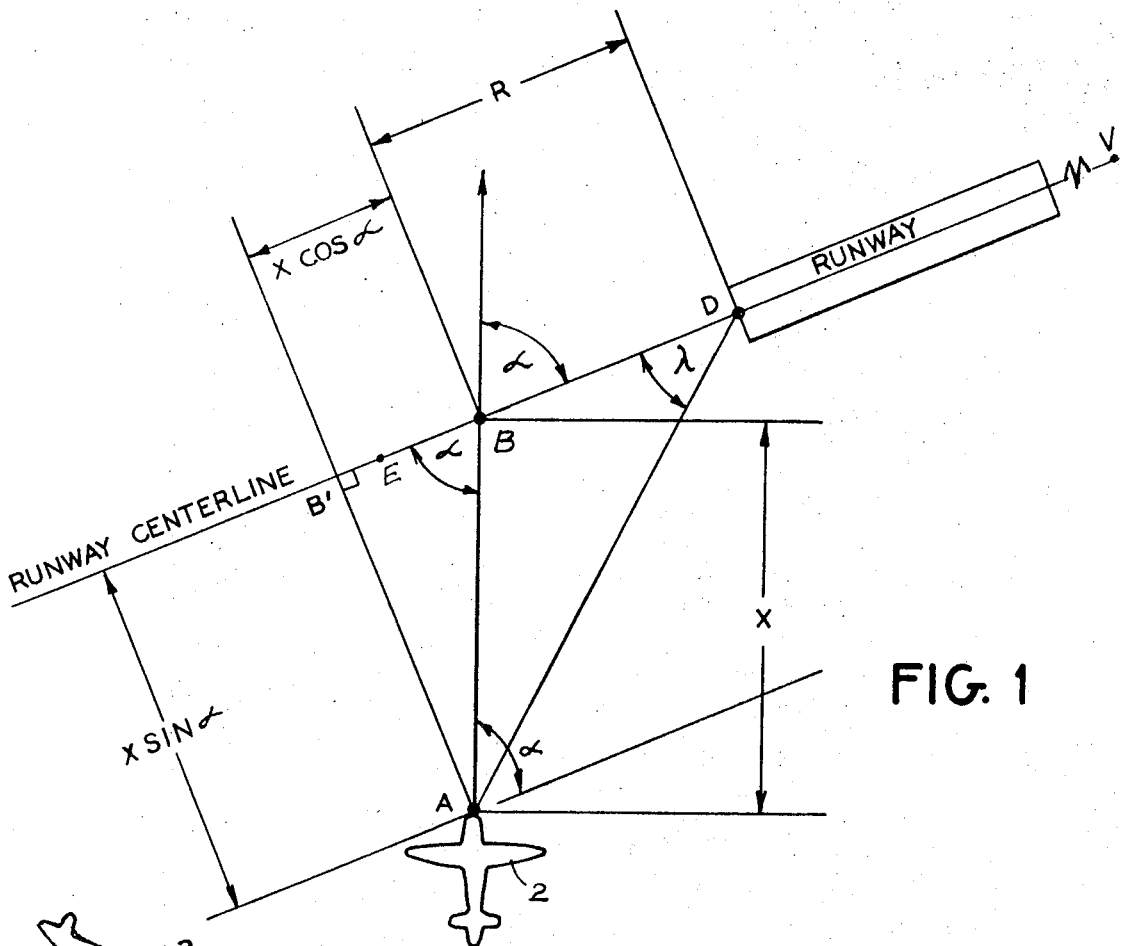
FIG. 1 is a diagrammatic representation showing a view in a horizontal plane of an aircraft approaching a runway.

With reference to FIG. 1, an aircraft 2 is at a point A and is flying a path to intersect the extended centerline of a runway at a point B. The distance from point A to point B is designated as x. The distance from point B to a predetermined point D on the runway, but not necessarily on the threshold thereof, is designated as R. A ground based signal transmitting station is located at a point E on the extended runway centerline. A line AB′, from point A perpendicular to the extended runway centerline is $x \sin \alpha$, wherein $\alpha$ is the angle between line AB and the extended runway centerline. The distance along the extended runway centerline from point B to point B′ is $x \cos \alpha$. The angle between line AD and the runway centerline is designated as $\lambda$. The tangent of angle $\lambda$ may be expressed as follows:

$$\operatorname{Tan} \lambda = \frac{x \sin \alpha}{R + x \cos \alpha} ; \text{ and}$$

for small angles, $\lambda$ in degrees may be expressed as follows:

$$\lambda = \frac{x \sin \alpha}{(R + x \cos \alpha) 0.0175} . \qquad (1)$$

Figure 2:
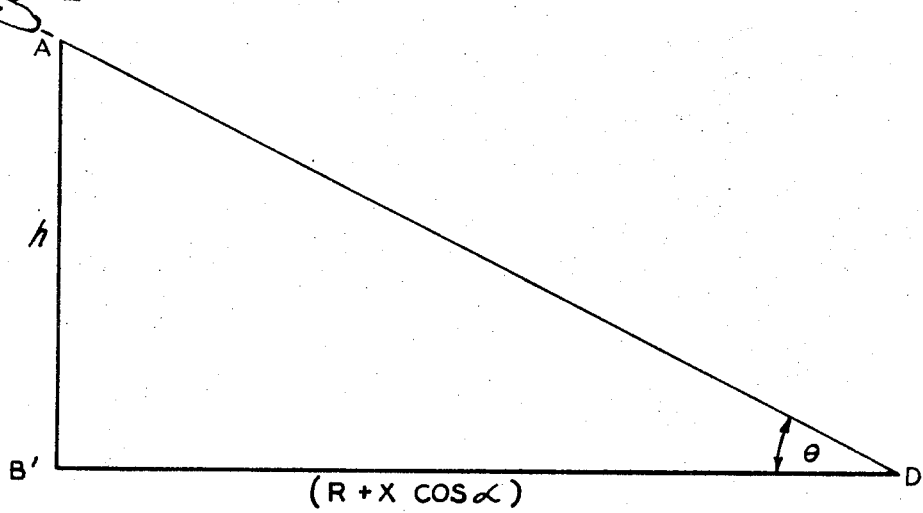
FIG. 2 is a diagrammatic representation showing a view in a vertical plane of an aircraft approaching a runway.

Referring now to FIG. 2, aircraft 2 is at an altitude $h$ above the runway and is flying at a flight path or glide slope angle $\Theta$. The craft is at a ground distance $(R + x \cos \alpha)$ from point D. The tangent of angle $\Theta$ may be expressed as follows:

$$\operatorname{Tan} \theta = \frac{h}{R + x \cos \alpha} ; \text{ and} \qquad (2)$$

for small angles $\Theta$ is expressed as follows:

$$\theta^\circ = \frac{h}{(R + x \cos \alpha) 0.0175} \qquad (3)$$

Referring further to the diagrammatic representations of FIGS. 1 and 2, with aircraft 2 at altitude $h$ and flying from point A to point B as heretofore noted, the ground distance of the craft from point D, measured parallel to the runway centerline, is always $(R + X \cos \alpha)$. As aircraft 2 moves toward point B, X decreases accordingly until the craft reaches point B, and at which time the ground distance is R. Point B′ is an imaginary point, not in the flight path of aircraft 2, and provided merely to implement the aforegoing trigonometric analysis wherein the term $(R + X \cos \alpha)$ is derived. In this connection it is to be understood that aircraft 2 is laterally displaced from imaginary point B′ by the distance $(X \sin \alpha)$ measured normal to the extended runway centerline. This displacement is not discernable in the elevation view of FIG. 2 and for this reason point A appears above point B′ in the FIG.

It is to be understood that a head-up display of the type to be hereinafter referred to and used with the device of the invention operates in conjunction with an All Weather Landing System which permits landings when visibility is zero and is of the type disclosed and claimed in the aforenoted U.S. Pat. Nos. 3,273,195 and 3,230,819. In this system signals are received from beacon transmitters placed along a runway. These signals are processed to appear as symbols on a head-up display including a cathode-ray tube directly in the pilots line of vision. As described in U.S. Pat. No. 3,237,195, an antenna system and receiver are placed in the aircraft for receiving and presenting a continuous picture of the beacons on the cathode-ray tube. To accomplish this, the antenna system compares signals from pairs of complementary antennas, after which the signals are passed through boxcar storage circuits and are applied to the vertical and horizontal deflection plates of the cathode-ray tube forming a picture on the tube screen. With the aforenoted teachings of the U.S. Pat. No. 3,237,195 in mind, the particular connections required to obtain the results desired in the present invention will now be understood by those skilled in the art. What the pilot sees are true perspective representations of what lies ahead. If one of the symbols is, for example, a horizontal line representing the horizon, the line must overlay the true horizon exactly. If the symbol is a marker indicating a specific azimuth angle, the marker must also be correctly positioned in azimuth. An improved system of the type described is shown in U.S. Pat. application Ser. No. 624,785 filed Mar. 31, 1967 by F. A. Rossire and assigned to The Bendix Corp.; assignee of the present invention.

Figure 3:
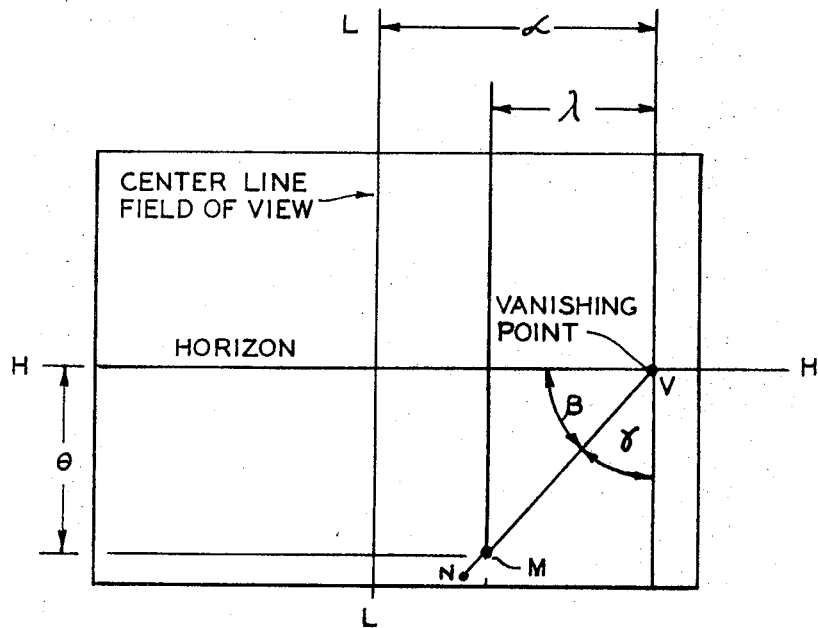
FIG. 3 is a diagrammatic representation showing a head-up display according to the invention.

Thus, there is shown in the head-up display of FIG. 3 a horizon line H—H and a marker N corresponding to a point on the centerline of the runway and provided in response to signals from the ground based transmitting station at point E in FIG. 1. Since the heading of the runway is known and point N on the runway is established, a line VN may be displayed wherein point V corresponds to a vanishing point on the horizon and line VN corresponds to the runway centerline. The display is such that the distance along horizon line H—H between vanishing point V and centerline L—L of the field of view of the display corresponds to angle $\alpha$ and the horizontal distance from point V toward centerline L—L corresponds to angle $\lambda$. Glide slope angle $\Theta$ is displayed perpendicular to horizon line H—H and is the vertical distance between horizontal distance $\lambda$ and runway centerline VM. The point of intersection between vertical distance $\Theta$ and runway centerline VN is designated as M. Angle $\beta$ is defined as the angle between line VMN and the horizontal and angle $\gamma$ is defined as the angle between line VMN and the vertical.

Considering the trigonometrical relationship previously derived from FIGS. 1 and 2 and appropriately substituting, an expression for angle $\gamma$ can be derived from FIG. 3 as follows:

$$\operatorname{Tan} \gamma = \frac{\lambda}{\theta} = \frac{x \sin \infty}{h}, \text{ or} \tag{4}$$

$$\operatorname{Tan} \gamma = \frac{x\infty}{h} \tag{5}$$

Figure 4:
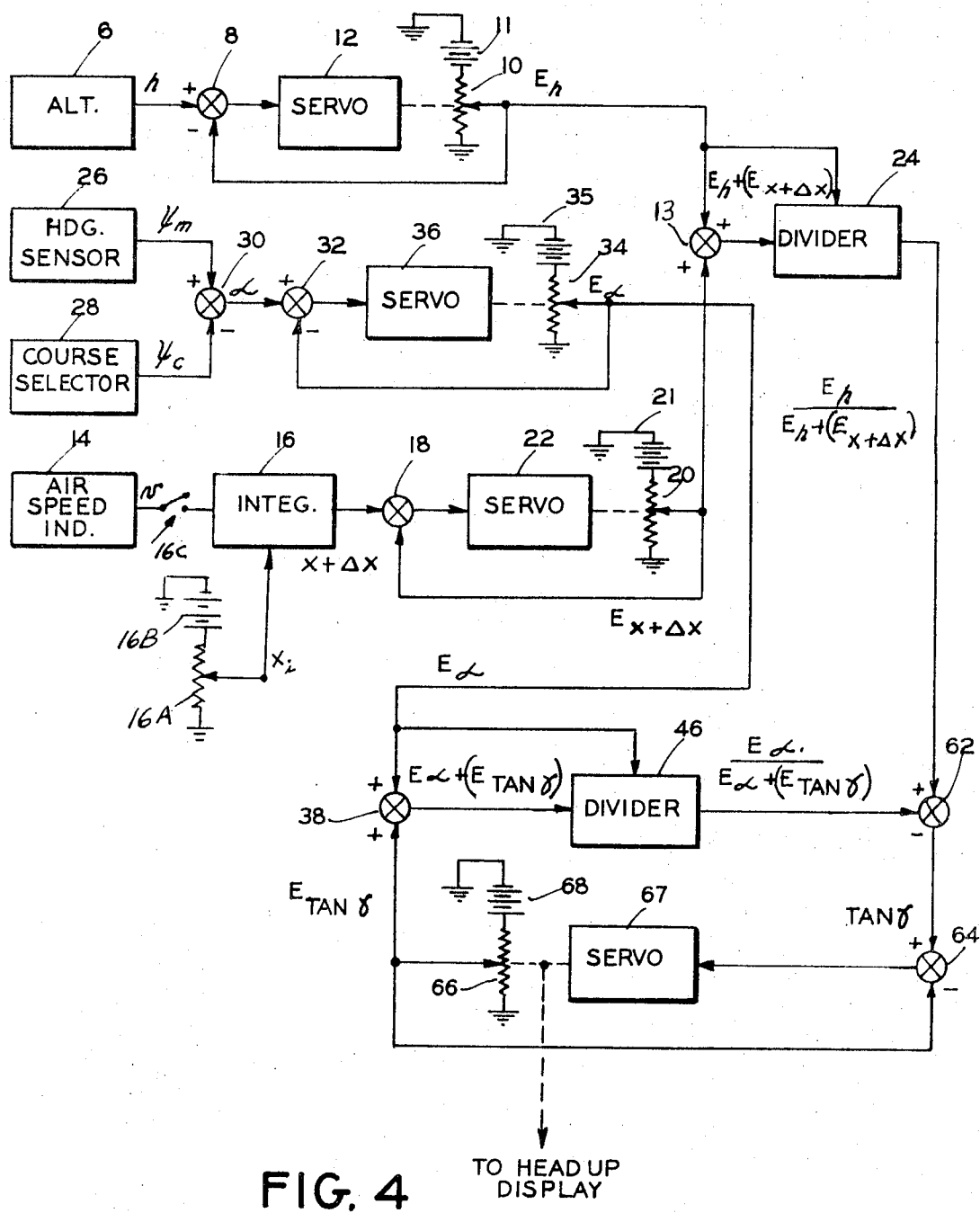
FIG. 4 is a block diagram showing apparatus according to the invention for aiding the pilot to land the aircraft.

With reference to FIG. 4, wherein the implementation of the aforegoing equations is shown, an altimeter 6 provides a signal $h$ corresponding to the altitude of aircraft 2, and which signal $h$ is applied to a summing means 8 and summed thereby with a signal $E_h$ from a feedback potentiometer 10 excited by a suitable source of direct current shown as a battery 11 and coupled by suitable mechanical means to the output shaft of a servo 12. Servo 12 is driven by the signal from summing means 8. Signal $E_h$ from potentiometer 10 is applied to a summing means 13.

An airspeed indicator 14 provides a signal Y corresponding to the airspeed of aircraft 2, and which signal Y is integrated by an integrator 16. The initial condition for integrator 16 is set by a manually adjusted potentiometer 16A and battery 16B combination. The pilot adjusts potentiometer 16A until the displayed centerline passes through point N shown in FIG. 3 so as to be coincident with the true runway centerline, and at which time potentiometer 16A provides a signal $x_i$. Integration is then started by closing a switch 16C. Integrator 16 provides signal $x + x_i = x + \Delta x$. The integrator signal is applied to a summing means 18 and summed thereby with a signal ($E_x + \Delta x$) from a feedback potentiometer 20 excited by a suitable source of direct current such as battery 21 and coupled by suitable mechanical means to the output shaft of a servo 22. Servo 22 is driven by the signal from summing means 18. Signal ($E_x + \Delta x$) from potentiometer 20 is applied to summing means 13 and summed thereby with signal $E_h$ to provide a signal $E_h + (E_x + \Delta x)$. Signal $E_h$ from potentiometer 10 and signal $E_h + (E_x + \Delta x)$ from summing means 13 are applied to a divider 24 which divides the signals and provides a signal $$\left[ \frac{E_h}{E_h + (E_x + \Delta x)} \right].$$

A heading sensor 26 provides a signal $\psi m$ corresponding to the heading of aircraft 2 and a course selector 28 provides a signal $\psi c$ corresponding to a runway heading manually selected by the pilot of aircraft 2. Signal $\psi m$ and signal $\psi c$ are applied to a summing means 30 which sums the signals and provides a heading error signal $\alpha$, and which signal $\alpha$ is the angle between the heading of aircraft 2 and the runway centerline shown in FIG. 1. Signal $\alpha$ is applied to a summing means 32 and summed thereby with a signal $E\alpha$ from a feedback potentiometer 34 excited by a suitable source of direct current shown as a battery 35 and coupled by suitable mechanical means to the output shaft of a servo 36. Servo 36 is driven by the signal from summing means 32.

Signal $E\alpha$ from potentiometer 34 is applied to a summing means 38 and summed thereby with a signal $E_{\tan \gamma}$ provided in a manner as will be hereinafter explained. Summing means 38 provides a signal $E\alpha + (E_{\tan \gamma})$, and which signal is applied to a divider 46. Signal $E\alpha$ is applied to divider 46 which divides the signals providing a signal $$\left[ \frac{E\infty}{E\infty + (E\tan\gamma)} \right].$$

The signal from divider 46 is applied to a summing means 62 and summed thereby with signal $$\left[ \frac{E_h}{E_h + (E_x + \Delta x)} \right]$$

from divider 24.

The signal provided by summing means 62 corresponds to $\tan\gamma$ in accordance with the following:

$$\left[ \frac{E\infty}{E\infty + (E_{\tan\gamma})} \right] - \left[ \frac{E_h}{E_h + (E_x + \Delta x)} \right] = 0; \text{ or} \tag{6}$$

$$\left[ \frac{E\infty + (E_{\tan\gamma})}{E\infty} \right] = \left[ \frac{E_h + (E_x + \Delta x)}{E_h} \right], \tag{7}$$

$$1 + \frac{(E_{\tan\gamma})}{E\infty} = 1 + \frac{(E_x + \Delta x)}{E_h}, \tag{8}$$

$$\frac{E\tan\gamma}{E\infty} = \frac{E_x + \Delta x}{E_h}, \tag{9}$$

$$E\tan\gamma = \frac{(E_x + \Delta x)E\infty}{E_h}, \text{ or} \tag{10}$$

$$\tan\gamma = \frac{x\infty}{h}. \tag{11}$$

Thus, if the signal from summing means 62 is a null, signal ($E_{\tan\gamma}$) and, hence, $\gamma$ is zero indicating that displayed centerline VN is coincident with the true runway centerline. If the displayed and true centerlines are not coincident, a voltage corresponding to $\tan\gamma$ is provided by summing means 62, and which voltage is applied to a summing means 64 and summed thereby with a signal from a feedback potentiometer 66 energized by a suitable source of direct current shown as a battery 68 and coupled by suitable mechanical means to the output shaft of a servo 67. Potentiometer 66 provides a signal $E_{\tan\gamma}$ which is applied to summing means 38 as heretofore noted. Servo 67 is driven by the signal from summing means 64.

The output shaft of servo 67 is coupled by suitable mechanical means to the head-up display shown in FIG. 3 and is effective for rotating centerline VMN about point V in accordance with the movement of aircraft 2. The rotation of the centerline may be accomplished by means described in the aforenoted U.S. Pat. No. 3,237,193 to Curry. In the patent, signals from various attitude sensing devices are applied to a coordinate transformer which may be a servo motor mechanically linked to provide relative rotation of the cathode-ray tube and its deflection plates. With the teachings of U.S. Pat. No. 3,237,193 in mind, the particular connections required for obtaining the results desired in the present invention will now be understood by those skilled in the art. In this connection it is to be noted that runway centerline VN is constantly rotated about point V in accordance with the position of aircraft 2. The pilot manually controls the craft so that the line intersects point N in the head-up display, i.e. the displayed runway centerline is coincident with the true centerline, or, alternatively, he may monitor an automatic flight control system.

In order to use the device of the invention, the pilot first sets course selector 28 to the heading of the runway selected for landing. He sets the head-up display of FIG. 3 by manually adjusting potentiometer 16A to change signal $x_i$, and which action in turn rotates displayed runway centerline VN about vanishing point V so that the line intersects marker N. He then switches on the automatic system of FIG. 4 through switch 16C to start integrator 16 and to automatically rotate the displayed centerline about point V as a function of airspeed, altitude and heading error so that the centerline continuously moves with the flight of aircraft 2. The pilot may check the accuracy of the system by observing that the centerline always intersects marker N and, if a discrepancy occurs, the system can be reset by readjusting potentiometer 16A and restarting integrator 16.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. Apparatus displaying the centerline of a runway for landing an aircraft in all weather conditions, comprising:
   means for providing a signal corresponding to aircraft altitude;
   means for providing a signal corresponding to aircraft speed;
   means for providing a signal corresponding to aircraft heading;
   means for providing a signal corresponding to the heading of the runway;
   first means connected to the aircraft altitude signal means and to the aircraft speed signal means for combining the signals therefrom;
   second means connected to the aircraft heading signal means, to the runway heading signal means and to the first means for combining the signals therefrom; and
   a display showing in real world perspective the earth's horizon, a line intersecting the horizon at a vanishing point and a marker corresponding to a point on the centerline of the runway, and being connected to the second means so that the line intersecting the horizon at the vanishing point rotates about said vanishing point in response to the signal from the second means.

2. Apparatus as described by claim 1, wherein the first means includes:
   means connected to the aircraft altitude signal means and to the aircraft speed signal means for summing the signals therefrom; and
   means connected to the summing means and to the aircraft altitude signal means for dividing the aircraft altitude signal by the summed signal.

3. Apparatus as described by claim 1, wherein the second means includes:
   means connected to the aircraft heading signal means and to the runway heading signal means for summing the signals therefrom and for providing a heading error signal;
   means for providing a signal corresponding to the angular displacement about the vanishing point of the line intersecting the horizon;
   means connected to the heading error signal means and to the last mentioned means for summing the signals therefrom; and
   means connected to the heading error signal means and to the summing means for dividing the heading error signal by the signal from the summing means.

4. Apparatus as described by claim 3, wherein the means for providing a signal corresponding to the angular displacement about the vanishing point of the line intersecting the horizon includes:
   means connected to the means for dividing the heading error signal by the signal from the summing means, and connected to the first means for summing the signals therefrom; and
   the summed signal corresponding to said angular displacement and being zero when the line intersecting the horizon intersects the marker.

5. Apparatus as described by claim 1, including:
   an integrator connecting the air speed signal means to the first means;
   a normally open switch for connecting the aircraft speed signal means to the integrator;
   means for providing a constant level reference signal when the line intersecting the horizon intersects the marker; and
   the integrator being connected to said means so as to be set by the signal therefrom whereupon the switch is closed for integrating the aircraft speed signal.

6. Apparatus as described by claim 5, including:
   means for varying the level of the reference signal so as to reset the integrator.

7. A method for displaying the centerline of a runway to land an aircraft in all weather conditions, comprising:
   displaying in real word perspective the earth's horizon, a line intersecting the horizon at a vanishing point and a marker corresponding to a point on the centerline of a selected runway;
   setting a course selector to the heading of the runway centerline;
   manually rotating the line intersecting the horizon about the vanishing point until it intersects the marker; and
   starting a system for automatically rotating the line intersecting the horizon so that said line rotates about the vanishing point in accordance with aircraft altitude, aircraft speed and aircraft heading.